US008485938B2

United States Patent
Wu et al.

(10) Patent No.: US 8,485,938 B2
(45) Date of Patent: Jul. 16, 2013

(54) OMNI-WHEEL BASED DRIVING DEVICE WITH ENHANCED MAIN WHEEL STRUCTURE

(75) Inventors: Chia-Wen Wu, Hsinchu (TW); Chi-Kuang Hwang, Hsinchu (TW)

(73) Assignee: Chung Hua University, Hsinchu (TW)

( * ) Notice: Subject to any disclaimer, the term of this patent is extended or adjusted under 35 U.S.C. 154(b) by 79 days.

(21) Appl. No.: 13/176,055

(22) Filed: Jul. 5, 2011

(65) Prior Publication Data

US 2011/0259653 A1    Oct. 27, 2011

Related U.S. Application Data

(62) Division of application No. 12/382,843, filed on Mar. 25, 2009, now abandoned.

(30) Foreign Application Priority Data

Dec. 26, 2008    (TW) ................................ 97150819 A

(51) Int. Cl.
    *F16H 13/00*    (2006.01)
(52) U.S. Cl.
    USPC ................ 476/36; 180/6.2; 180/7.1; 474/167

(58) Field of Classification Search
    USPC ...... 476/36, 67, 69, 72; 180/6.2, 7.1; 474/166, 474/167
    See application file for complete search history.

(56) References Cited

U.S. PATENT DOCUMENTS 3,746,117 A * 7/1973 Alred .............................. 180/21
5,186,270 A * 2/1993 West ............................. 180/6.62
7,980,336 B2 * 7/2011 Takenaka et al. .............. 180/7.1

FOREIGN PATENT DOCUMENTS

JP        2001-354156    * 12/2001

* cited by examiner

*Primary Examiner* — William C Joyce
(74) *Attorney, Agent, or Firm* — Rosenberg, Klein & Lee

(57) ABSTRACT

An omni-wheel based driving mechanism includes a spherical wheel, a pair of first omni wheels, and a pair of second omni wheels. The first omni wheels are arranged at two sides of the spherical wheel to space from each other by a predetermined distance in a first direction, so that the spherical wheel is rollably positioned between the first omni wheels. The second omni wheels are arranged at another two sides of the spherical wheel to space from each other by a predetermined distance in a second direction, so that the spherical wheel is rollably positioned between the second omni wheels. Therefore, a good driving efficiency can be obtained between the spherical wheel and the first omni wheels and the second omni wheels.

16 Claims, 8 Drawing Sheets

OMNI-WHEEL BASED DRIVING DEVICE WITH ENHANCED MAIN WHEEL STRUCTURE

REFERENCE TO RELATED APPLICATION

This application is a Divisional application of patent application Ser. No. 12/382,843, filed 25 Mar. 2009, now abandoned.

FIELD OF THE INVENTION

The present invention relates to a drive mechanism, and more particularly to an omni-wheel based drive mechanism.

BACKGROUND OF THE INVENTION

With the constantly developed scientific technologies, the use of robots has become highly popular among different industrial and commercial fields. There are many different types of drive mechanisms designed for robots. One of the most common robots is a wheeled robot provided with one or more wheels. Usually, for the purpose of keeping static and dynamic balance, the conventional wheeled robots have three or more wheels each. In the case of having a large number of wheels, the robot usually requires a relatively large turning radius to move to another direction. Thus, while a robot with more wheels can be accepted for use outdoors, it fails to move smoothly when being used indoors, such as in a house, because the paths available in the house for the robot are usually narrow and complicated.

To enable the robot to easily move along the narrow and complicated indoor paths, other types of robots capable of keeping static and dynamic balance have been developed, including two-wheeled robots employing the inverted pendulum principle, single-axle-driven one-wheeled robots with an ellipsoid wheel, and one-wheeled robots with inverse mouse-ball drive.

The two-wheeled robot is uneasy to change its moving direction because the wheels thereof are set to a fixed direction. For a two-wheeled robot to move in a new moving direction, the robot must first be turned to orient toward the new moving direction.

The one-wheeled robot moves via a spherical wheel, which is driven by a pair of orthogonally arranged drive rollers to roll in two directions. An idler roller is provided corresponding to each of the two drive rollers. The spherical wheel is held in place by the drive rollers and idler rollers without the risk of separating therefrom, so that the drive rollers keep contacting with the spherical wheel to drive the same to roll smoothly.

When the spherical wheel is driven by one of the drive rollers to roll on the floor, the other drive roller and idler roller orthogonal to the first drive roller are not able to rotate forward in a direction the same as the rolling direction of the spherical wheel. That is, the other drive roller and the idler roller corresponding thereto do not move but slip relative to the spherical wheel. For the spherical wheel to roll smoothly, the spherical wheel must have a relatively high friction to assist in the driving by the drive roller. However, the spherical wheel must also have a relatively low friction to allow the slipping between it and the other drive roller and idler roller. In designing the spherical wheel, it is always desirable to have high friction between the spherical wheel and the floor to avoid slippage of the spherical wheel on the floor. The high friction of the spherical wheel would, however, cause difficulty in slipping between the spherical wheel and the drive roller and the idler roller and accordingly, have adverse influence on the driving efficiency of the drive roller.

In conclusion, there are still many problems being encountered with in designing the drive mechanism for a robot. A robot with three or more wheels can stably maintain balance, but it requires a relatively large space to turn around and is therefore not suitable for using indoors. A two-wheeled robot requires only a shortened turning radius and is able to pivot turn using two wheels. However, whenever it is desired to change the moving direction of the two-wheeled robot, the robot must first be turned before it can move in the new direction. And, in the one-wheeled robot, the required friction between the spherical wheel and the drive rollers and idler rollers is different from the required friction between the spherical wheel and the floor, and it is impossible for the spherical wheel to have a high friction and a low friction at the same time. As a result, the one-wheeled robot usually has relatively low driving efficiency.

SUMMARY OF THE INVENTION

A primary object of the present invention is to provide an omni-wheel based drive mechanism that enables good driving of a spherical wheel with a plurality of omni wheels and vice versa.

To achieve the above objects, the present invention provides an omni-wheel based driving mechanism which includes a spherical wheel, a pair of first omni wheels, and a pair of second omni wheels. The first omni wheels are arranged at two sides of the spherical wheel to space from each other by a predetermined distance in a first direction, so that the spherical wheel is rollably positioned between the first omni wheels. Each of the first omni wheels includes a main wheel, a plurality of guide rollers, and a drive axle. The main wheel has an axial direction, which is normal to the first direction. The guide rollers are rotatably mounted on and spaced along a circumferential wheel face of the main wheel, such that the guide roller on the first omni wheel is pressed against the spherical surface of the spherical wheel. The second omni wheels are arranged at another two sides of the spherical wheel to space from each other by a predetermined distance in a second direction, so that the spherical wheel is rollably positioned between the second omni wheels. Each of the second omni wheels wheel includes a main wheel, a plurality of guide rollers, and a drive axle. The main wheel has an axial direction, which is normal to the second direction. The guide rollers are rotatably mounted on and spaced along a circumferential wheel face of the main wheel, such that at least one of the guide rollers on the second omni wheel is pressed against the spherical surface of the spherical wheel.

In a preferred embodiment, the omni-wheel based drive mechanism includes a control circuit. The control circuit includes a processing unit, a driving control unit which is connected to the processing unit, a first driving unit, and a second driving unit. Both the first and the second driving unit are electrically connected to the driving control unit for respectively driving the first omni wheels and the second omni wheels to rotate.

With the technical means adopted by the present invention, the omni wheels can keep rotating in a rotating direction following the rolling direction of the spherical wheel without the risk of becoming stuck due to different included angles between the omni wheels and the spherical wheel. Therefore, it is not necessary to produce the spherical wheel with a low-friction material to ensure the slipping between the spherical wheel and the omni wheels. Meanwhile, under guiding by the omni wheels, the spherical wheel can roll in a smooth manner to ensure high driving efficiency.

With respect to the driving efficiency of the present invention, since the spherical wheel is driven to roll by paired omni wheels, enhanced and balanced driving force can be obtained. In addition, there is a relatively large contact area between the omni wheels and the spherical wheel to ensure sufficient friction force and accordingly, reduced possibility of undesired slipping between them. Further, the driving forces produced by the omni wheels are always tangent to the spherical wheel and can therefore produce the largest torque while driving the spherical wheel. Moreover, during driving, it is a plurality of guide rollers mounted on the circumferential wheel faces of the omni wheels that sequentially contact with the spherical wheel. Since the wheel faces of the omni wheels are not in direct and close contact with the spherical wheel, the problem of accumulated dust between the omni wheels and the spherical wheel can be avoided.

With the present invention, both the structural weight and the structural load of the whole omni-wheel based drive mechanism will be transformed into a contact force between the omni wheels and the spherical wheel. The contact force will increase proportionally with the increasing structural weight or the structural load to reduce the possibility of undesired slipping. Further, the magnitude of the contact force is in a fixed proportion to the space between two omni wheels in one pair. The smaller the space between the paired omni wheels is, the larger the contact force between the omni wheels and the spherical wheel will be. Therefore, it is possible to apply the drive mechanism of the present invention to different loading conditions by adjusting the space between the paired omni wheels.

Further, when the contact force between the omni wheels and the spherical wheel increases with the structural weight and structural load of the drive mechanism, the drive mechanism also has a braking capability increased with the increasing contact force. Therefore, it is also possible to adjust the braking capability of the drive mechanism by adjusting the space between the paired omni wheels.

In practical application, the conventional one-wheeled robot is highly sensitive to the contact between the spherical wheel and the drive rollers. Any slight deformation of the spherical wheel would result in unsmooth driving. Therefore, it is usually necessary to make the spherical wheel with a tough material that is not easily subject to deformation and therefore not suitable for rolling on general road surfaces. On the other hand, in the omni-wheel based drive mechanism of the present invention, the contact between the omni wheels and the spherical wheel is not affected by any deformation of the spherical wheel. Therefore, the spherical wheel in the present invention can be made of a rubber material similar to that for making automobile tyres and be used on general road surfaces without being limited to roll only on a smooth floor.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
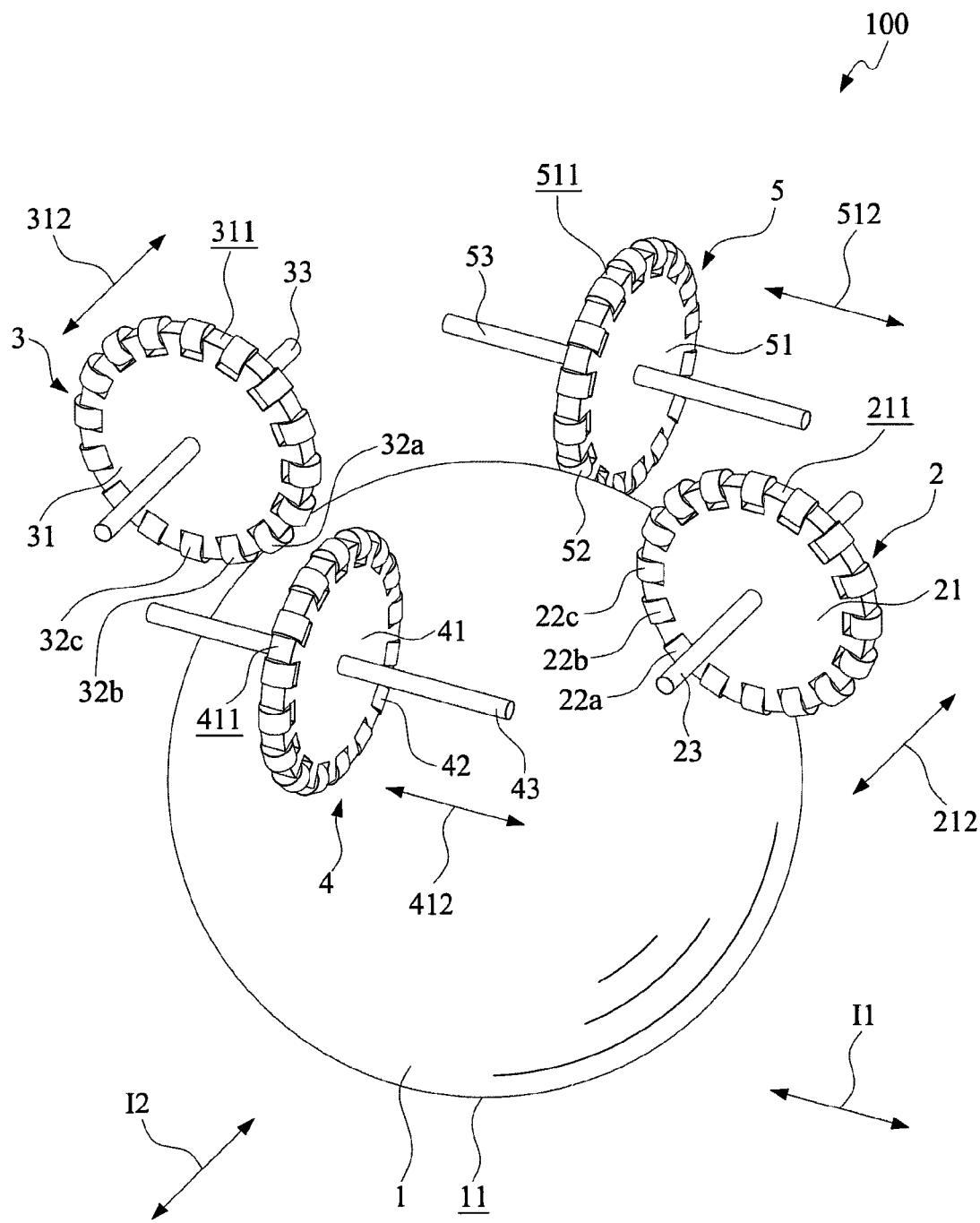
FIG. 1 is a perspective view showing an omni-wheel based drive mechanism according to a first embodiment of the present invention.
Figure 2:
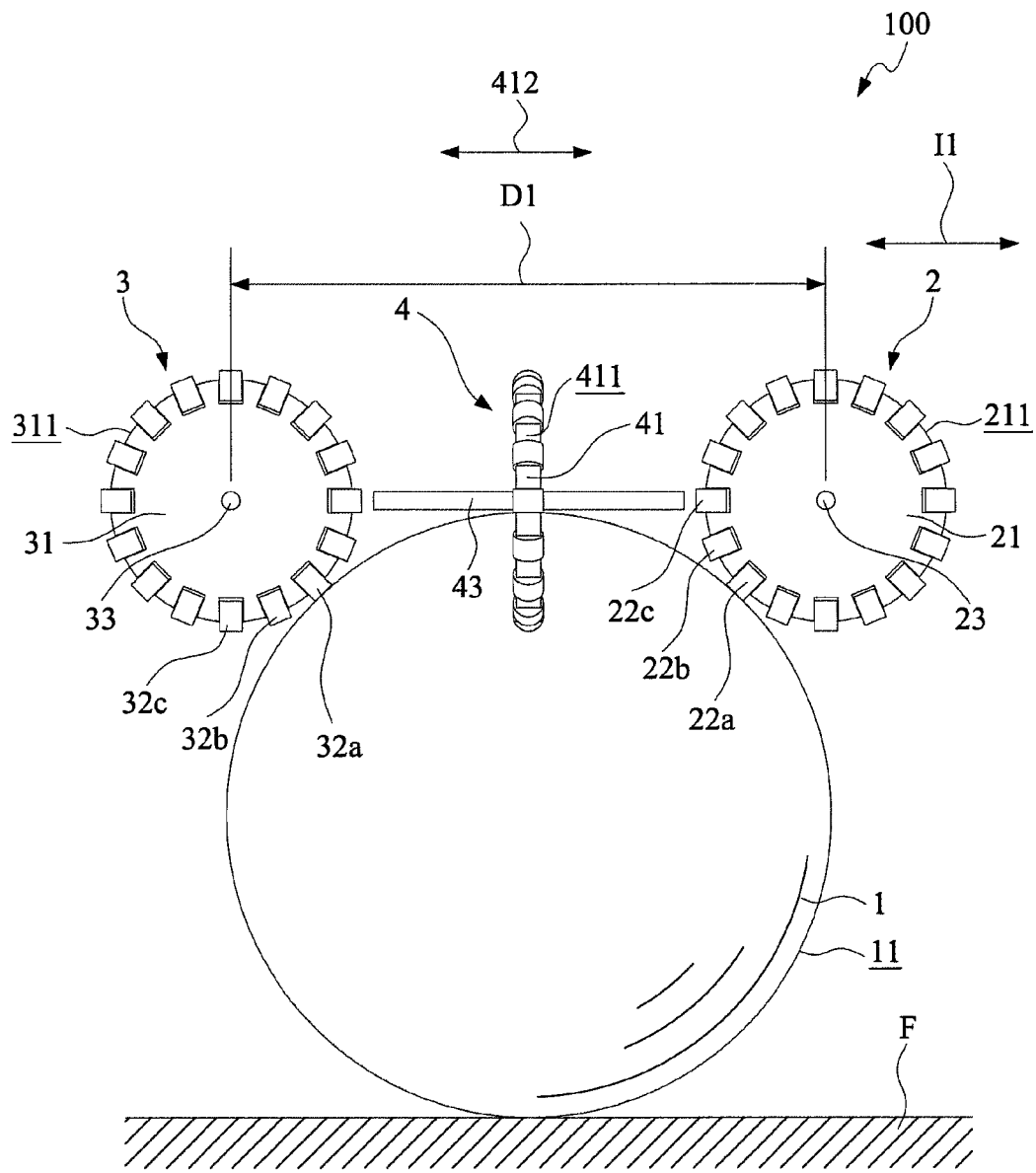
FIG. 2 is a side view of the omni-wheel based drive mechanism according to the first embodiment of the present invention.
Figure 3:
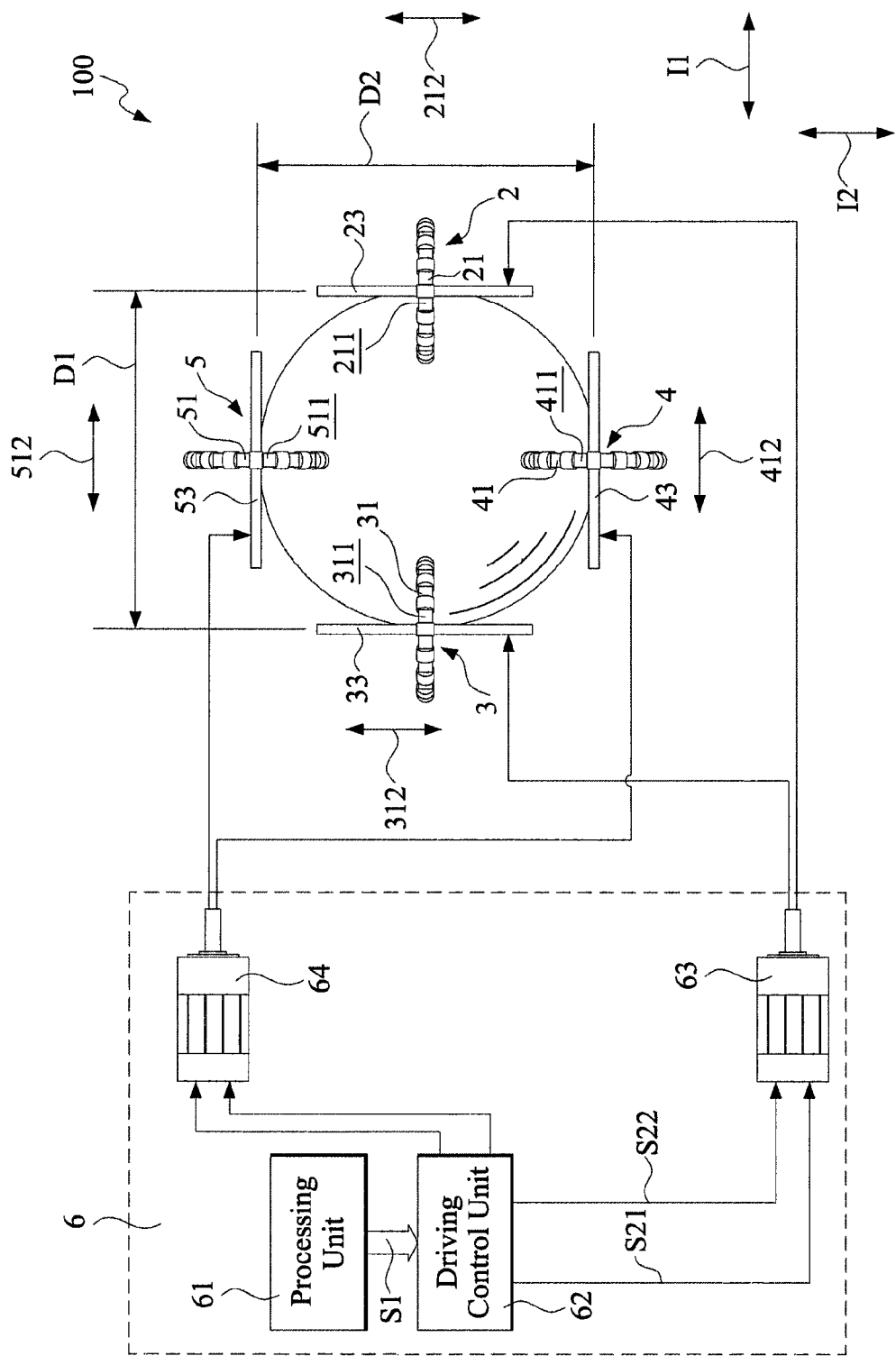
FIG. 3 is a top view of the omni-wheel based drive mechanism according to the first embodiment of the present invention.

Please refer to FIGS. 1, 2, and 3. FIG. 1 is a perspective view showing an omni-wheel based drive mechanism according to a first embodiment of the present invention, and FIGS. 2 and 3 are respectively a side and top view of the omni-wheel based drive mechanism. An omni-wheel based drive mechanism according to a first embodiment of the present invention, which is generally denoted by a reference numeral 100, includes a spherical wheel 1, a pair of first omni wheels 2, 3, a pair of second omni wheels 4, 5, and a control circuit 6.

The spherical wheel 1 has a spherical surface 11, and is made of a rubber material for rolling on a target plane F. The first omni wheels 2, 3 are arranged at two sides of the spherical wheel 1 to space from each other by a predetermined distance D1 in a first direction I1. The second omni wheels 4, 5 are arranged at another two sides of the spherical wheel 1 to space from each other by a predetermined distance D2 in a second direction I2.

The first omni wheel 2 includes a main wheel 21, a plurality of guide rollers 22a, 22b, 22c (only some of the guide rollers are labeled for illustration purpose), and a drive axle 23. The main wheel 21 has an axial direction 212, which is normal to the first direction I1. The guide rollers 22a, 22b, 22c are rotatably mounted on and spaced along a circumferential wheel face 211 of the main wheel 21, such that the guide roller 22a on the first omni wheel 2 is pressed against the spherical surface 11 of the spherical wheel 1.

The other first omni wheel 3 includes a main wheel 31, a plurality of guide rollers 32a, 32b, 32c (only some of the guide rollers are labeled for illustration purpose), and a drive axle 33. The main wheel 31 has an axial direction 312, which is normal to the first direction I1. The guide rollers 32a, 32b, 32c are rotatably mounted on and spaced along a circumferential wheel face 311 of the main wheel 31, such that the guide roller 32a on the first omni wheel 3 is pressed against the spherical surface 11 of the spherical wheel 1. Therefore, the spherical wheel 1 is rollably positioned between the pair of first omni wheels 2 and 3.

The second omni wheel 4 includes a main wheel 41, a plurality of guide rollers 42, and a drive axle 43. The main wheel 41 has an axial direction 412, which is normal to the second direction I2. The guide rollers 42 are rotatably mounted on and spaced along a circumferential wheel face 411 of the main wheel 41, such that at least one of the guide rollers 42 on the second omni wheel 4 is pressed against the spherical surface 11 of the spherical wheel 1.

The other second omni wheel 5 includes a main wheel 51, a plurality of guide rollers 52, and a drive axle 53. The main wheel 51 has an axial direction 512, which is normal to the second direction I2. The guide rollers 52 are rotatably mounted on and spaced along a circumferential wheel face 511 of the main wheel 51, such that at least one of the guide rollers 52 on the second omni wheel 5 is pressed against the spherical surface 11 of the spherical wheel 1. Therefore, the spherical wheel 1 is rollably positioned between the pair of second omni wheels 4 and 5.

In the first embodiment, the first direction I1 and the second direction I2 are orthogonal to each other. The spherical wheel 1 is positioned among the first omni wheels 2, 3 and the second omni wheels 4, 5. Of course, the first and the second direction I1, I2 are not necessarily orthogonal to each other, but can contain other different angles between them, depending on actual design and intended use of the drive mechanism.

The control circuit 6 includes a processing unit 61, a driving control unit 62, a first driving unit 63, and a second driving unit 64. The driving control unit 62 is electrically connected to the processing unit 61; and both of the first and the second driving unit 63, 64 are electrically connected to the driving control unit 62. The first driving unit 63 is used to drive the first omni wheels 2, 3, to rotate and the second driving unit 64 is used to drive the second omni wheels 4, 5 to rotate. In the first embodiment, the first and the second driving unit 63, 64 are direct-current (DC) motors. However, it is understood the first and the second driving unit 63, 64 can be otherwise stepping motors or other types of driving mechanisms.

Figure 4:
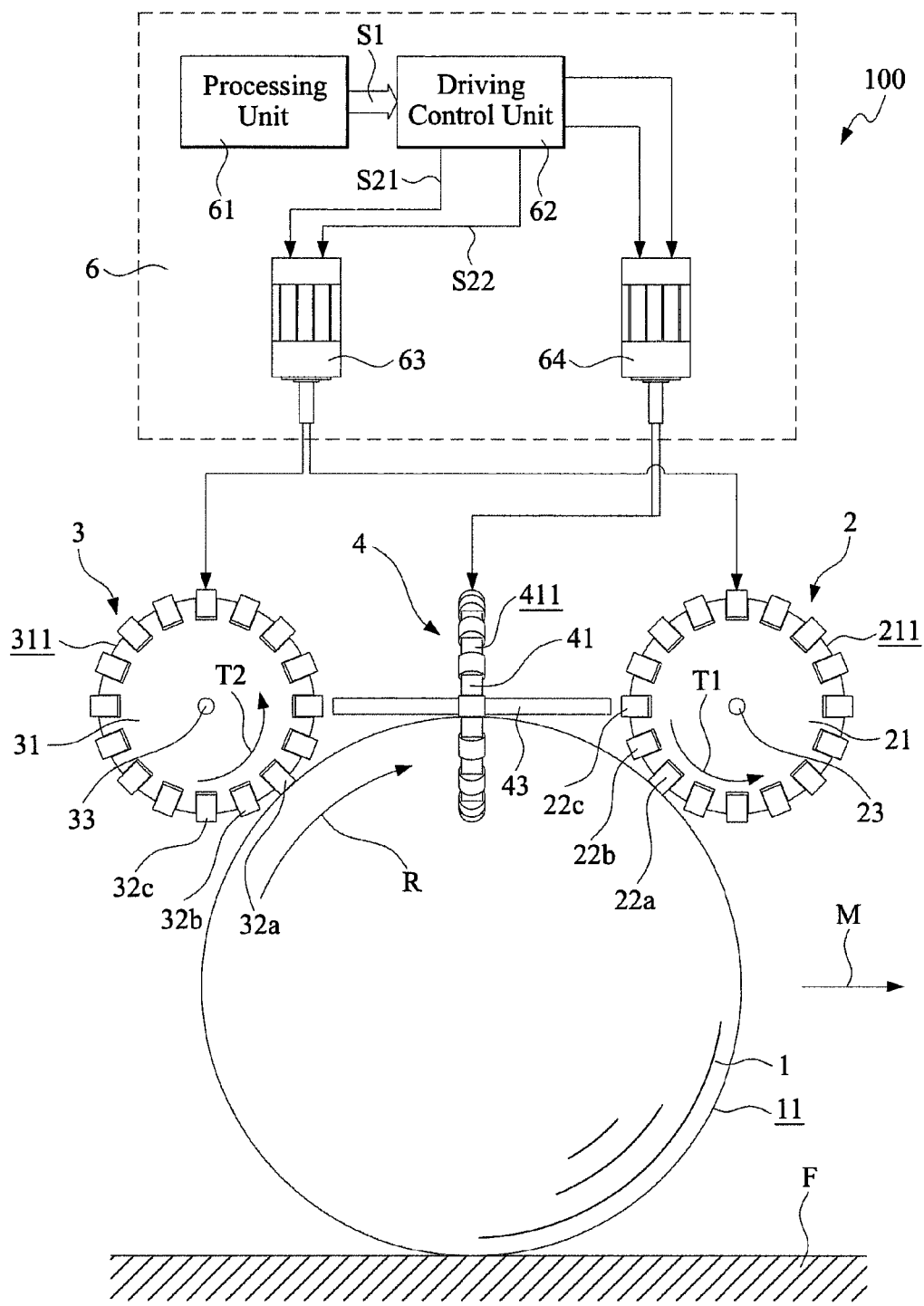
FIG. 4 shows the manner of motion of the omni-wheel based drive mechanism according to the first embodiment of the present invention.

Please refer to FIG. 4. FIG. 4 shows the manner of motion of the omni-wheel based drive mechanism. When it is desired to move the omni-wheel based driving mechanism 100 in a direction M, a motion signal S1 is generated by the processing unit 61 to the driving control unit 62. Based on the received motion signal S1, the driving control unit 62 generates two control signals S21, S22 to actuate the first driving unit 63, so that the first driving unit 63 drives the first omni wheels 2, 3 to rotate.

When the first omni wheel 2 is driven by the first driving unit 63 to rotate in a rotating direction T1, the guide rollers 22a, 22b, 22c sequentially contact with the spherical surface 11 of the spherical wheel 1. Similarly, when the other first omni wheel 3 is driven by the first driving unit 63 to rotate in a rotating direction T2, which is the same as the direction T1, the guide rollers 32a, 32b, 32c sequentially contact with the spherical surface 11 of the spherical wheel 1. That is, the two first omni wheels 2, 3 synchronously bring the spherical wheel 1 to roll in a rolling direction R to move forward on the plane F in the first direction I1.

In the illustrated embodiment, only the pair of first omni wheels 2, 3 is driven. However, it is also possible to drive the pair of second omni wheels 4, 5, or to drive only one of the omni wheels.

Figure 5:
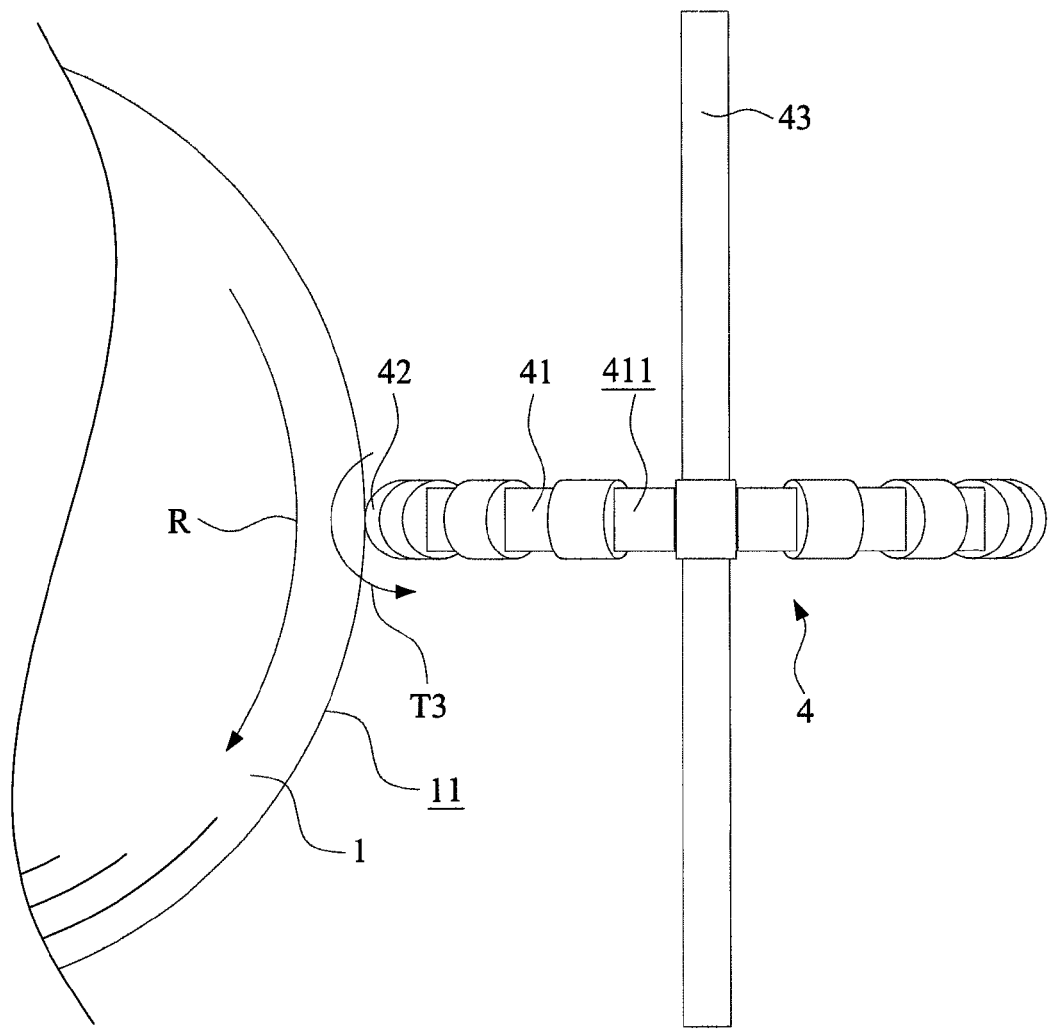
FIG. 5 is a fragmentary and enlarged view showing the motion relation between a guide roller on an omni wheel and a spherical ball in the omni-wheel based drive mechanism of the present invention.

Please refer to FIG. 5 which is a fragmentary and enlarged view showing the motion relation between a guide roller on an omni wheel and a spherical ball in the omni-wheel based drive mechanism. The guide roller 42 on the second omni wheel 4 in contact with the spherical wheel 1 is brought by the spherical wheel 1 to rotate forward in a rotating direction T3 the same as the rolling direction R of the spherical wheel 1. Under guiding of the guiding roller 42, the spherical wheel 1 can roll smoothly without the risk of slipping. Since the other second omni wheel 5 operates in the same manner as the second omni wheel 4, it is not repeatedly discussed herein.

While the spherical wheel 1 in the illustrated first embodiment is brought by the omni wheels to roll, the present invention can also be applied to a mouse ball. That is, it is also possible to roll the spherical wheel 1 so as to rotate the first omni wheels 2, 3 and the second omni wheels 4, 5. Please refer to FIGS. 4 and 5 at the same time. When the spherical wheel 1 rolls in a rolling direction R to move in the first direction I1, the first omni wheels 2, 3 in contact with the spherical wheel 1 via the guide rollers 22a, 32a are brought by the spherical wheel 1 to rotate forward in rotating directions T1, T2, respectively, which are the same as the rolling direction R of the spherical wheel 1. Meanwhile, one of the guide rollers 42 on the second omni wheel 4 in contact with the spherical wheel 1 is brought by the spherical wheel 1 to rotate forward in the rotating direction T3, which is the same as the rolling direction R of the spherical wheel 1. Since the other second omni wheel 5 operates in the same manner as the second omni wheel 4, it is not repeatedly discussed herein.

Figure 6:
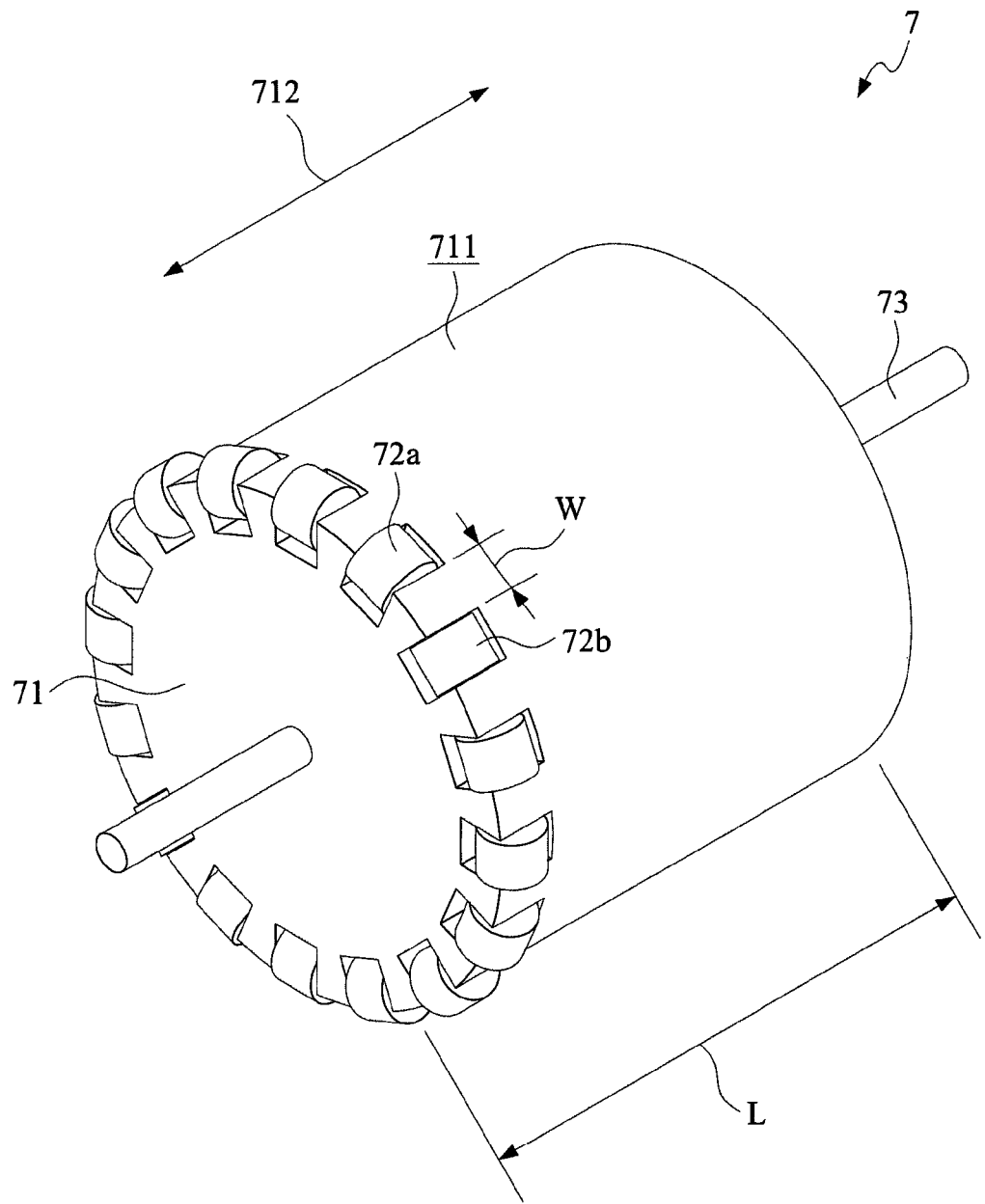
FIG. 6 is a perspective view of an omni wheel for an omni-wheel based drive mechanism according to a second embodiment of the present invention.

Please refer to FIG. 6, in which an omni wheel 7 for an omni-wheel based drive mechanism according to a second embodiment of the present invention is shown. The omni wheel 7 includes a main wheel 71, a plurality of guide rollers 72, and a drive axle 73. The main wheel 71 has a circumferential wheel face 711 and an axial direction 712. The guide rollers 72 are rotatably mounted on and spaced along the wheel face 711. Compared to the omni wheel in the first embodiment, the main wheel 71 of the omni wheel 7 in the second embodiment has an increased overall length L in the axial direction 712 and is therefore relatively thick. When a space W between two adjacent guide rollers 72a and 72b is relatively small, that is, when the number of the guide rollers 72 is increased, the relatively thick main wheel 71 can provide higher mechanical stress to maintain the omni wheel 7 in a complete structure without being easily subjected to destruction.

Figure 7:
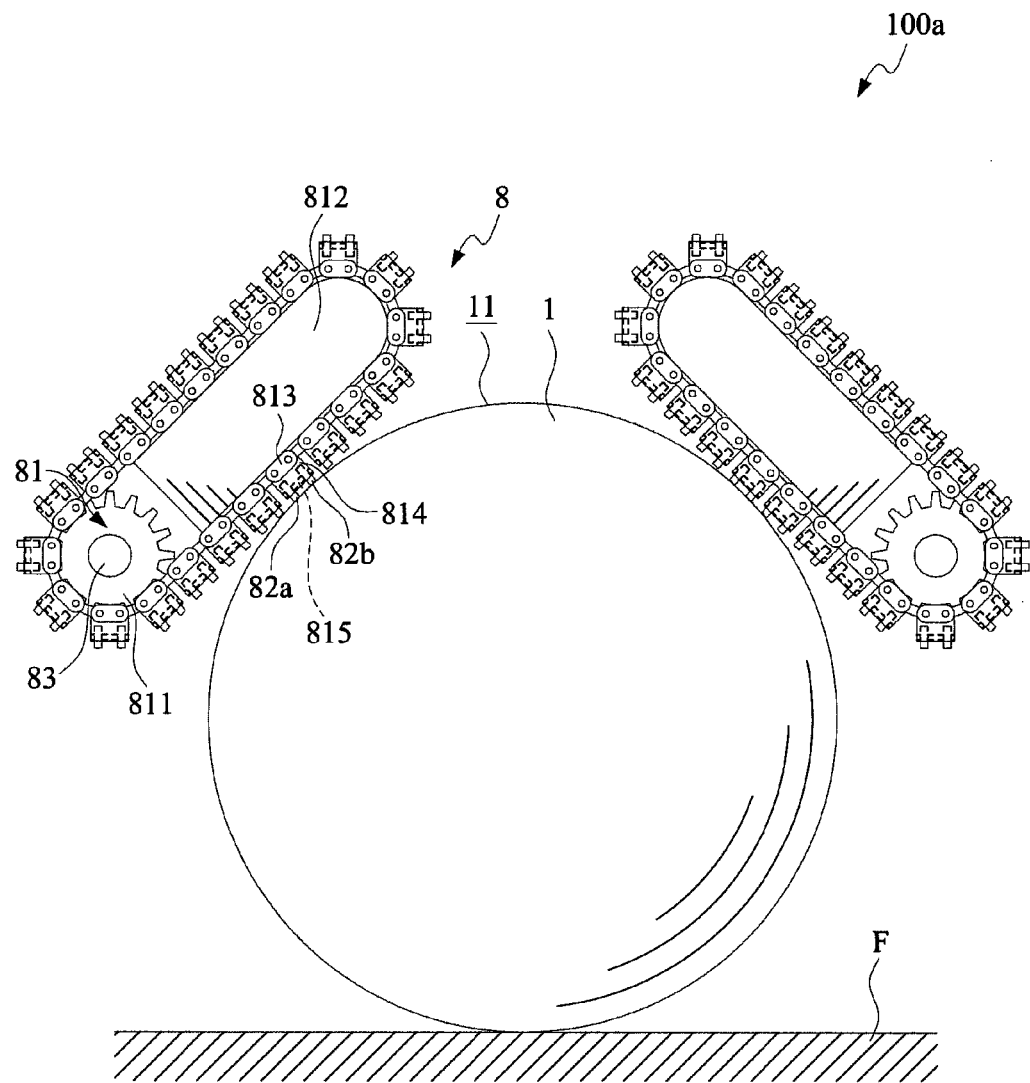
FIG. 7 is side view showing an omni-wheel based drive mechanism according to a third embodiment of the present invention.
Figure 8:
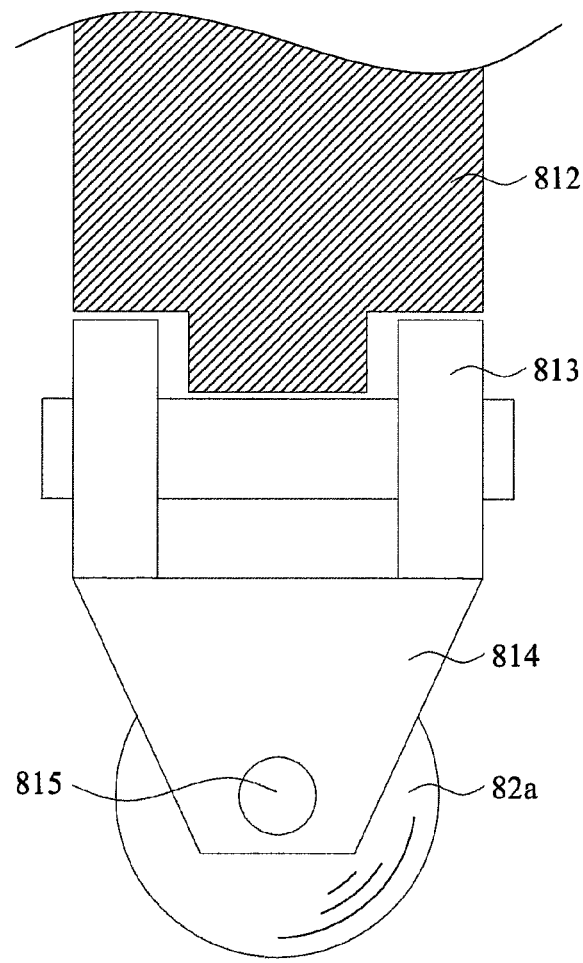
FIG. 8 is a fragmentary and enlarged side view of a link for a chain used in the omni-wheel based drive mechanism according to the third embodiment of the present invention.

FIG. 7 is a side view showing an omni-wheel based drive mechanism 100a according to a third embodiment of the present invention. FIG. 8 is a fragmentary and enlarged side view of a link for a chain used in the omni-wheel based drive mechanism. The omni-wheel based drive mechanism 100a is generally structurally similar to the previous embodiments, and includes a plurality of omni wheels 8. Each of the omni wheels 8 includes a main wheel 81, a plurality of guide rollers 82a, 82b, and a drive axle 83.

The third embodiment is different from the previous embodiments in that the main wheel 81 of the omni wheel 8 includes a driving wheel 811, a guide rail 812, and a driving belt. The driving belt is wound around the driving wheel 811 and the guide rail 812. The guide rollers 82a, 82b are rotatably mounted on and spaced along the driving belt. When the driving wheel 811 brings the driving belt to move, the guide rollers 82a, 82b on the driving belt sequentially contact with the spherical face 11 of the spherical wheel 1, bringing the spherical wheel 1 to roll.

In the illustrated third embodiment, the driving wheel 811 is a driving gearwheel, and the driving belt is a chain 813 consisting of a plurality of serially connected links 814. FIG. 8 is a fragmentary and enlarged side view of one link 814 for the chain 813. As shown, the guide rollers 82a, 82b of the omni wheel 8 are rotatably mounted on the links 814 via pivot shafts 815. Compared to the driving through contact between two curved surfaces, that is, the contact between the rotating main wheel and the rolling spherical wheel, the chain-type driving utilizes the contact between a linear surface and a curved surface, that is, the contact between the moving chain and the rolling spherical wheel, and enables the guide rollers 82a, 82b to contact with the spherical wheel 1 in a more smooth manner. Thus, the drive mechanism in the third embodiment does not easily produce vibration due to a sawtooth problem during contact of the guide rollers with the spherical wheel.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An omni-wheel based driving mechanism, comprising:
   a spherical wheel having a spherical surface;
   a pair of first omni wheel assemblies being arranged at two sides of the spherical wheel to space from each other by a predetermined distance in a first direction; each of the first omni wheel assemblies including a main wheel and a plurality of guide rollers, the main wheel having an axial direction normal to the first direction, and at least one of the guide rollers on the first omni wheel assemblies being pressed against the spherical surface of the spherical wheel, so that the spherical wheel is rollably positioned between the pair of first omni wheel assemblies; and
   a pair of second omni wheel assemblies being arranged at another two sides of the spherical wheel to space from each other by a predetermined distance in a second direction; each of the second omni wheel assemblies including a main wheel and a plurality of guide rollers, the main wheel having an axial direction normal to the second direction, and at least one of the guide rollers on the second omni wheel assemblies being pressed against the spherical surface of the spherical wheel, so that the spherical wheel is rollably positioned between the pair of second omni wheel assemblies;
   whereby when the pair of first omni wheel assemblies or the pair of second omni wheel assemblies are rotated, the guide rollers mounted thereon sequentially contact with the spherical surface of the spherical wheel to thereby bring the spherical wheel to roll in the first or the second direction, respectively;
   wherein a driving belt is wound around the main wheel of each of the first omni wheel assemblies, and the guide rollers on each of the first omni wheel assemblies are rotatably mounted on and spaced along the driving belt;
   whereby when each of the first omni wheel assemblies is driven to rotate, the main wheel brings the driving belt to move, so that the guide rollers rotatably mounted on the driving belt sequentially contact with the spherical surface of the spherical wheel, bringing the spherical wheel to roll.

2. The omni-wheel based driving mechanism as claimed in claim 1, wherein the first direction and the second direction are orthogonal to each other.

3. The omni-wheel based driving mechanism as claimed in claim 1, further comprising a control circuit for driving the pair of first omni wheel assemblies and the pair of second omni wheel assemblies to rotate.

4. The omni-wheel based driving mechanism as claimed in claim 3, wherein the control circuit includes:
   a processing unit;
   a driving control unit being electrically connected to the processing unit;
   a first driving unit being electrically connected to the driving control unit for driving the pair of first omni wheel assemblies to rotate; and
   a second driving unit being electrically connected to the driving control unit for driving the pair of second omni wheel assemblies to rotate.

5. The omni-wheel based driving mechanism as claimed in claim 4, wherein the first driving unit is selected from the group consisting of a direct-current (DC) motor and a stepping motor.

6. The omni-wheel based driving mechanism as claimed in claim 4, wherein the second driving unit is selected from the group consisting of a direct-current (DC) motor and a stepping motor.

7. The omni-wheel based driving mechanism as claimed in claim 1, wherein the spherical wheel is made of a rubber material.

8. The omni-wheel based driving mechanism as claimed in claim 1, wherein each of the first omni wheel assemblies further includes a guide rail arranged close to the driving wheel, and the driving belt is wound around the driving wheel and the guide rail.

9. The omni-wheel based driving mechanism as claimed in claim 1, wherein
   a driving belt is wound around the main wheel of each of the second omni wheel assemblies, and the guide rollers on each of the second omni wheel assemblies are rotatably mounted on and spaced along the driving belt;
   whereby when each of the second omni wheel assemblies is driven to rotate, the main wheel brings the driving belt to move, so that the guide rollers rotatably mounted on the driving belt sequentially contact with the spherical surface of the spherical wheel, bringing the spherical wheel to roll.

10. The omni-wheel based driving mechanism as claimed in claim 9, wherein each of the second omni wheel assemblies further includes a guide rail arranged close to the driving wheel, and the driving belt is wound around the driving wheel and the guide rail.

11. An omni-wheel based driving mechanism, comprising:
   a spherical wheel having a spherical surface;
   a pair of first omni wheel assemblies being arranged at two sides of the spherical wheel to space from each other by a predetermined distance in a first direction; each of the first omni wheel assemblies including a main wheel and a plurality of guide rollers, the main wheel having an axial direction normal to the first direction, and at least one of the guide rollers on the first omni wheel assemblies being pressed against the spherical surface of the spherical wheel, so that the spherical wheel is rollably positioned between the pair of first omni wheel assemblies; and
   a pair of second omni wheel assemblies being arranged at another two sides of the spherical wheel to space from each other by a predetermined distance in a second direction; each of the second omni wheel assemblies including a main wheel and a plurality of guide rollers, the main wheel having an axial direction normal to the second direction, and at least one of the guide rollers on the second omni wheel assemblies being pressed against the spherical surface of the spherical wheel, so that the spherical wheel is rollably positioned between the pair of second omni wheel assemblies;
   whereby when the spherical wheel rolls in a rolling direction, the first and second omni wheel assemblies in contact with the spherical wheel via the guide rollers are brought by the spherical wheel to rotate in the same direction as the rolling direction;
   wherein a driving belt is wound around the main wheel of each of the first omni wheel assemblies, and the guide rollers on each of the first omni wheel assemblies are rotatably mounted on and spaced along the driving belt;

whereby when each of the first omni wheel assemblies is driven to rotate, the main wheel brings the driving belt to move, so that the guide rollers rotatably mounted on the driving belt sequentially contact with the spherical surface of the spherical wheel, bringing the spherical wheel to roll.

12. The omni-wheel based driving mechanism as claimed in claim 11, wherein the first direction and the second direction are orthogonal to each other.

13. The omni-wheel based driving mechanism as claimed in claim 11, wherein the spherical wheel is made of a rubber material.

14. The omni-wheel based driving mechanism as claimed in claim 11, wherein each of the first omni wheel assemblies further includes a guide rail arranged close to the driving wheel, and the driving belt is wound around the driving wheel and the guide rail.

15. The omni-wheel based driving mechanism as claimed in claim 11, wherein a driving belt is wound around the driving main wheel of each of the second omni wheel assemblies, and the guide rollers on each of the second omni wheel assemblies are rotatably mounted on and spaced along the driving belt;

whereby when each of the second omni wheel assemblies is driven to rotate, the main wheel brings the driving belt to move, so that the guide rollers rotatably mounted on the driving belt sequentially contact with the spherical surface of the spherical wheel, bringing the spherical wheel to roll.

16. The omni-wheel based driving mechanism as claimed in claim 15, wherein each of the second omni wheel assemblies further includes a guide rail arranged close to the driving wheel, and the driving belt is wound around the driving wheel and the guide rail.

* * * * *